United States Patent
Oono et al.

(10) Patent No.: US 12,218,771 B2
(45) Date of Patent: Feb. 4, 2025

(54) CONVERSATION CONTROL DEVICE, CONVERSATION SYSTEM, AND CONVERSATION CONTROL METHOD

(71) Applicant: NTT Communications Corporation, Tokyo (JP)

(72) Inventors: Satoshi Oono, Tokyo (JP); Kousuke Bannai, Tokyo (JP); Yoshiki Mizushima, Tokyo (JP); Touma Takeda, Tokyo (JP)

(73) Assignee: NTT Communications Corporation, Tokyo (JP)

( * ) Notice: Subject to any disclaimer, the term of this patent is extended or adjusted under 35 U.S.C. 154(b) by 0 days.

(21) Appl. No.: 18/159,788

(22) Filed: Jan. 26, 2023

(65) Prior Publication Data

US 2023/0171118 A1 Jun. 1, 2023

Related U.S. Application Data

(63) Continuation of application No. PCT/JP2021/027991, filed on Jul. 29, 2021.

(30) Foreign Application Priority Data

Jul. 31, 2020 (JP) .................................. 2020-130848

(51) Int. Cl.
*H04L 12/18* (2006.01)
*G06F 3/04817* (2022.01)

(52) U.S. Cl.
CPC ...... *H04L 12/1813* (2013.01); *G06F 3/04817* (2013.01)

(58) Field of Classification Search
CPC ............. H04L 12/1813; H04L 12/1822; H04L 12/1827
See application file for complete search history.

(56) References Cited

U.S. PATENT DOCUMENTS 8,144,633 B2 * 3/2012 Yoakum .............. H04L 65/4015
348/14.05
8,661,359 B2 * 2/2014 Karmon ................ G06T 11/206
715/752

(Continued)

FOREIGN PATENT DOCUMENTS

JP 8-316953 A 11/1996
JP 2007-25946 A 2/2007

(Continued)

OTHER PUBLICATIONS

International Search Report issued Aug. 31, 2021 in PCT/JP2021/027991 filed on Jul. 29, 2021, 4 pages (with English Translation).

(Continued)

*Primary Examiner* — Ryan F Pitaro
(74) *Attorney, Agent, or Firm* — Oblon, McClelland, Maier & Neustadt, L.L.P.

(57) ABSTRACT

A conversation control device includes: a display information generator configured to generate display data necessary for displaying a conference room area image which is an image indicating a virtual conference room in which a conversation is held via a network and which is currently installed and an icon image indicating a user on a user terminal; a conference room controller configured to control participation of a user in the conference room in response to the user's operation; and a conversation controller configured to control a conversation between users participating in the same conference room.

4 Claims, 10 Drawing Sheets

(56) References Cited

U.S. PATENT DOCUMENTS

| | | | |
|---|---|---|---|
| 9,210,247 B2* | 12/2015 | Vance | G06F 3/04845 |
| 11,616,701 B2* | 3/2023 | Brockners | H04L 12/1827 |
| | | | 715/734 |
| 2004/0017376 A1* | 1/2004 | Tagliabue | H04M 1/27475 |
| | | | 345/581 |
| 2006/0253787 A1* | 11/2006 | Fogg | G06Q 10/10 |
| | | | 715/752 |
| 2012/0204119 A1 | 8/2012 | Lefar et al. | |
| 2013/0246942 A1* | 9/2013 | Merrifield | G06T 13/40 |
| | | | 715/757 |
| 2014/0115059 A1 | 4/2014 | Van Wie et al. | |
| 2018/0284961 A1* | 10/2018 | Henderson | G06F 3/0488 |
| 2018/0309806 A1* | 10/2018 | Huynh | G06F 3/04886 |
| 2018/0331841 A1* | 11/2018 | Ross | H04L 41/0895 |
| 2021/0250392 A1* | 8/2021 | Levine | H04M 3/566 |
| 2021/0377062 A1* | 12/2021 | Stevens | H04L 12/1822 |
| 2022/0321507 A1* | 10/2022 | Skuratowicz | G06F 3/0481 |

FOREIGN PATENT DOCUMENTS

| | | |
|---|---|---|
| JP | 2007-52801 A | 3/2007 |
| JP | 2011-40037 A | 2/2011 |
| JP | 2012-213013 A | 11/2012 |
| JP | 2013-141201 A | 7/2013 |
| JP | 2013-533526 A | 8/2013 |
| WO | WO 2009/055307 A2 | 4/2009 |
| WO | WO 2011/136786 A1 | 11/2011 |

OTHER PUBLICATIONS

Japanese Office Action issued Dec. 22, 2023 in Japanese Application 2020-130848, (with English translation), 7 pages.
Extended European Search Report issued on Dec. 4, 2023 in European Application No. 21850480.1, 7 pages.

* cited by examiner

CONVERSATION CONTROL DEVICE, CONVERSATION SYSTEM, AND CONVERSATION CONTROL METHOD

TECHNICAL FIELD

The present invention relates to a technique for realizing an online conversation.

Priority is claimed on Japanese Patent Application No. 2020-130848, filed Jul. 31, 2020, the content of which is incorporated herein by reference.

BACKGROUND ART

In the related art, systems for holding a conversation or a conference via a network have been proposed. In such systems, face images of participants captured by a camera, icons of the participants, and the like are generally displayed. For example, Patent Document 1 describes that captured images of face areas of users are extracted and displayed with a blurred background. A user can understand which persons are participating in a conference by seeing the displayed face images or icons.

CITATION LIST

Patent Document

Patent Document 1

Japanese Unexamined Patent Application, First Publication No. 2012-213013

SUMMARY OF INVENTION

Technical Problem

In the related art, a WEB conference is held on the basis of the premise that users participate in a conference in which the users are predetermined to participate. Accordingly, a situation in which a plurality of WEB conferences are held in parallel is not originally assumed. In the future, there is a likelihood that a plurality of WEB conferences will be held in parallel. In this case, each user needs to determine whether to participate in each WEB conference. These problems are not limited to WEB conferences, and may occur commonly in conversations or conferences which are held via a network.

In consideration of the aforementioned circumstances, an objective of the present invention is to provide a technique for enabling easier selection of a desired conversation or conference out of a plurality of conversations or conferences.

Solution to Problem

According to an aspect of the present invention, there is provided a conversation control device including: a display information generator configured to generate display data necessary for displaying a conference room area image which is an image indicating a virtual conference room in which a conversation is held via a network and which is currently installed and an icon image indicating a user on a user terminal; a conference room controller configured to control participation of a user in the conference room in response to the user's operation; and a conversation controller configured to control a conversation between users participating in the same conference room.

In the conversation control device according to the aspect of the present invention, the conference room controller may be configured to perform a process of allowing a user to participate in the conference room corresponding to the conference room area image in response to the user's predetermined operation on the conference room area image.

In the conversation control device according to the aspect of the present invention, the conversation controller may be configured to output speech details of a user participating in the conference room to a user who is connected to the conference room in a mode other than participation, and the conversation controller may be configured not to output speech details of the user who is connected to the conference room in the mode to the user participating in the conference room.

According to another aspect of the present invention, there is provided a conversation system including: an image data generator configured to generate image data including a conference room area image which is an image indicating a virtual conference room in which a conversation is held via a network and which is currently installed and an icon image indicating a user on a user terminal; a conference room controller configured to control participation of a user in the conference room in response to the user's operation; and a conversation controller configured to control a conversation between users participating in the same conference room, wherein the image data generator is configured to generate image data in which an icon image of a user participating in the conference room is disposed inside of the conference room area image indicating the conference room.

According to another aspect of the present invention, there is provided a conversation control method including: generating display data necessary for displaying a conference room area image which is an image indicating a virtual conference room in which a conversation is held via a network and which is currently installed and an icon image indicating a user on a user terminal; controlling participation of a user in the conference room in response to the user's operation; and controlling a conversation between users participating in the same conference room.

Advantageous Effects of Invention

According to the present invention, it is possible to more easily select a desired conversation or conference out of a plurality of conversations or conferences.

DESCRIPTION OF EMBODIMENTS

Hereinafter, a specific configuration example of the present invention will be described with reference to the accompanying drawings.

Figure 1:
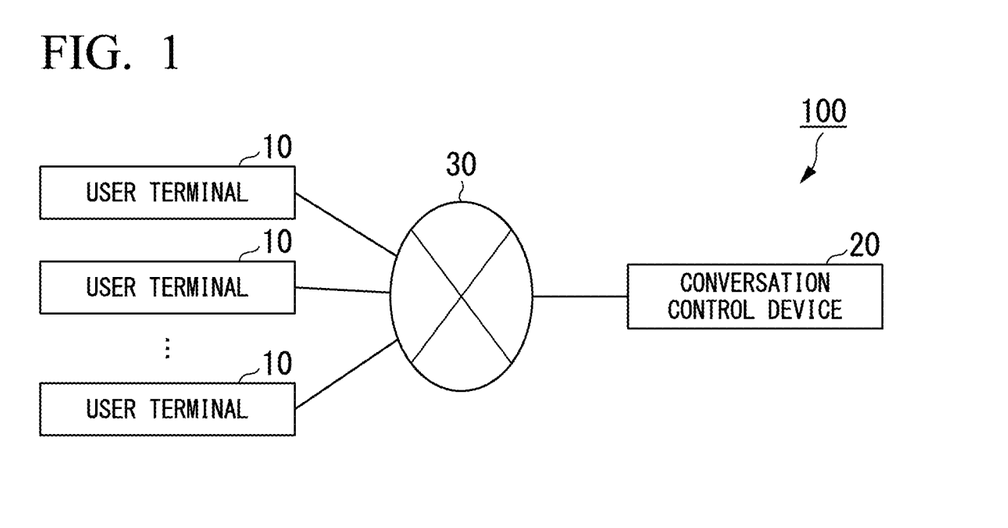
FIG. 1 is a block diagram schematically illustrating a system configuration of a conversation system 100 according to an embodiment of the present invention.

FIG. 1 is a block diagram schematically illustrating a system configuration of a conversation system 100 according to an embodiment of the present invention. The conversation system 100 is a system that allows users operating user terminals 10 to hold a conversation via a network 30. The conversation system 100 includes a plurality of user terminals 10 and a conversation control device 20. The plurality of user terminals 10 and the conversation control device 20 are communicatively connected via the network 30. The network 30 may be a network based on wireless communication or may be a network based on wired communication. The network 30 may include a combination of a plurality of networks.

Figure 2:
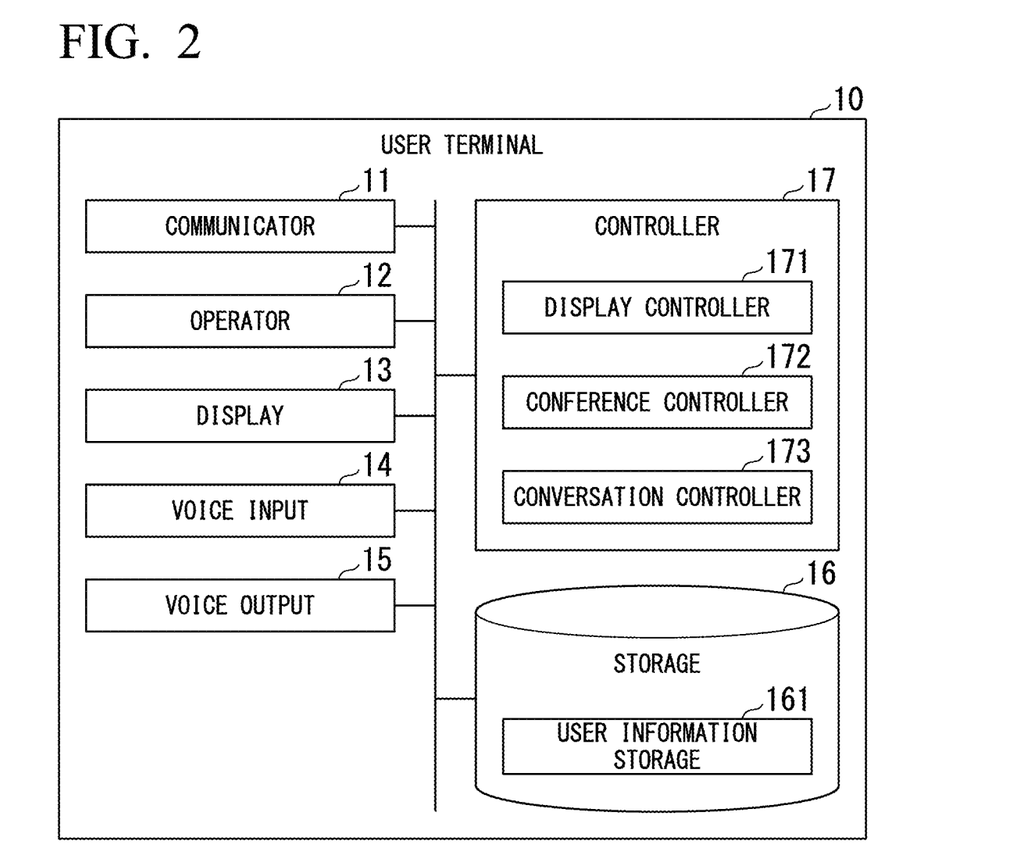
FIG. 2 is a block diagram schematically illustrating an example of a functional configuration of a user terminal 10.

FIG. 2 is a block diagram schematically illustrating an example of a functional configuration of a user terminal 10. The user terminal 10 is constituted, for example, by an information device such as a smartphone, a tablet, a personal computer, a mobile game machine, a stationary game machine, or a dedicated device. The user terminal 10 includes a communicator 11, an operator 12, a display 13, a voice input 14, a voice output 15, a storage 16, and a controller 17.

The communicator 11 is a communication device. The communicator 11 may be configured, for example, as a network interface. The communicator 11 performs data communication with another device via the network 30 under the control of the controller 17. The communicator 11 may be a device that performs wireless communication or may be a device that performs wired communication.

The operator 12 is constituted by an existing input device such as a keyboard, a pointing device (such as a mouse or a tablet), buttons, or a touch panel. The operator 12 is operated by a user when the user inputs the user's instruction to the user terminal 10. The operator 12 may be an interface that connects an input device to the user terminal 10. In this case, the operator 12 inputs an input signal generated on the basis of the user's input in the input device to the user terminal 10. The operator 12 may be constituted by a microphone and a voice recognition device. In this case, the operator 12 voice-recognizes words uttered by a user and inputs character string information as a result of recognition to the user terminal 10. The operator 12 may have any configuration as long as it can input a user's instruction to the user terminal 10.

The display 13 is an image display device such as a liquid crystal display or an organic electroluminescence (EL) display. The display 13 displays image data which is used for a user to hold a conversation. The display 13 may be an interface that connects an image display device to the user terminal 10. In this case, the display 13 generates a video signal for displaying image data and outputs the video signal to the image display device connected thereto.

The voice input 14 is constituted by a microphone. The voice input 14 may be configured as a microphone or may be configured as an interface that connects a microphone which is an external device to the user terminal 10. The microphone acquires vocal sound uttered by a user who holds a conversation. The voice input 14 outputs voice data acquired by the microphone to the controller 17.

The voice output 15 is constituted by a voice output device such as a speaker, headphones, or earphones. The voice output 15 may be configured as a voice output device or may be configured as an interface that connects a voice output device which is an external device to the user terminal 10. It is preferable that the voice output device output vocal sound such that a user who holds the conversation can recognize the vocal sound. The voice output 15 outputs vocal sound based on a voice signal output from the controller 17.

The storage 16 is constituted by a storage device such as a magnetic hard disk device or a semiconductor storage device. The storage 16 stores data which is used by the controller 17. The storage 16 may serve, for example, as a user information storage 161. The user information storage 161 stores information on a user who operates the user terminal 10 (hereinafter referred to as "user information"). User information may include, for example, a screen name of a user, icon data of the user, and attribute information of the user. The screen name is a name (a nickname or a real name) which is used for a user to hold a conversation using the conversation system 100. Icon data is image data which is used for a user to hold a conversation using the conversation system 100. Attribute information may include, for example, information on age, sex, or a department of a user.

The controller 17 is constituted by a processor such as a central processing unit (CPU) and a memory. The controller 17 serves as a display controller 171, a conference controller 172, and a conversation controller 173 by causing the processor to execute a program. All or some of the functions of the controller 17 may be realized in hardware such as an application-specific integrated circuit (ASIC), a programmable logic device (PLD), or a field-programmable gate array (FPGA). The program may be recorded on a computer-readable recording medium. Examples of a computer-readable recording medium include portable media such as a flexible disk, a magneto-optical disc, a read only memory (ROM), a compact disc (CD)-ROM, and a semiconductor storage device (for example, a solid state drive (SSD)) and a storage device such as a hard disk or a semiconductor storage device incorporated into a computer system. The program may be transmitted via an electric telecommunication line.

The display controller 171 receives display information from the conversation control device 20 via the communicator 11. The display controller 171 generates an image signal on the basis of the acquired display information and displays an image indicated by the generated image signal on the display 13. The display information may be, for example, image data indicating an image to be displayed. In this case, a main entity (an image data generator) that generates the image data is a display information generator 233 (which will be described later) of the conversation control device 20. The display information may be, for example, data indicating information necessary for generating an image to be displayed (for example, information indicating a position, a size, and a display mode of a conference room to be displayed or positions and icon images of users). In this case, the display controller 171 generates image data to be displayed on the display 13 on the basis of the display information. In this case, a main entity (an image data generator) that generates image data is the display controller 171.

The conference controller 172 performs control associated with a conference which is virtually provided in the conversation control device 20. For example, when a user instructs to install a new conference room by operating the operator 12, the conference controller 172 performs a process of installing the new conference room.

The conversation controller 173 performs control associated with a conversation which is made with a user of another user terminal 10. The conversation which is made with the user of the other user terminal 10 may be carried out as a conversation which is held without entering the conference room (hereinafter referred to as a "private conversation") or may be carried out as a conversation with a user participating in the installed conference room (hereinafter referred to as a "conference-room conversation"). For example, the conversation controller 173 transmits voice data input from the voice input 14 to the conversation control device 20 via the communicator 11. When voice data is received from the conversation control device 20, the conversation controller 173 outputs the received voice data from the voice output 15.

Figure 3:
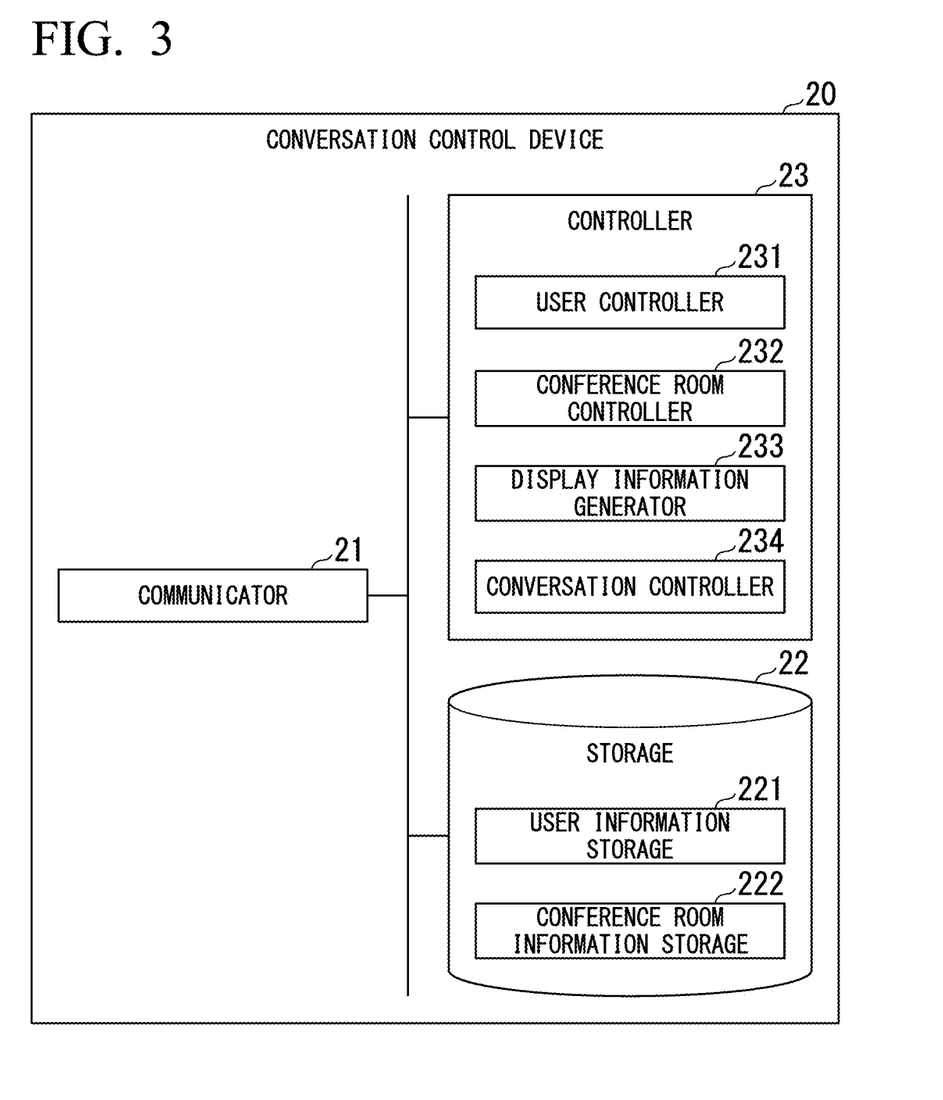
FIG. 3 is a block diagram schematically illustrating an example of a functional configuration of a conversation control device 20.

FIG. 3 is a block diagram schematically illustrating an example of a functional configuration of the conversation control device 20. The conversation control device 20 is constituted by, for example, an information processing device such as a personal computer or a server device. The conversation control device 20 includes a communicator 21, a storage 22, and a controller 23.

The communicator 21 is a communication device. The communicator 21 may be configured, for example, as a network interface. The communicator 21 performs data communication with another device via the network 30 under the control of the controller 23. The communicator 21 may be a device that performs wireless communication or may be a device that performs wired communication.

The storage 22 is constituted by a storage device such as a magnetic hard disk device or a semiconductor storage device. The storage 22 stores data which is used by the controller 23. The storage 22 may serve, for example, as a user information storage 221 and a conference room information storage 222. The user information storage 221 stores information on a plurality of users who operates the user terminals 10 (hereinafter referred to as "user information"). User information on a plurality of users may be registered in advance in the conversation control device 20.

The conference room information storage 222 stores information on a conference room (hereinafter referred to as "conference room information"). A conference room is a virtual room that is installed for a user to hold a conversation in the conversation system 100. For example, the conference room information may include information indicating a theme set in a conference room, information indicating a name set for the conference room, information indicating a date and time of reservation for installation of the conference room, and information on attributes of the conference room. The information on attributes of a conference room may include the number of users to enter the conference room and information indicating users who can enter the conference room. The conference room information may additionally include information indicating whether the conference room is currently installed or reserved for installation or information indicating users who are currently in the conference room.

The controller 23 is constituted by a processor such as a CPU and a memory. The controller 23 serves as a user controller 231, a conference room controller 232, a display information generator 233, and a conversation controller 234 by causing the processor to execute a program. All or some of the functions of the controller 23 may be realized in hardware such as an ASIC, a PLD, or an FPGA. The program may be recorded on a computer-readable recording medium. Examples of a computer-readable recording medium include portable media such as a flexible disk, a magneto-optical disc, a ROM, a CD-ROM, and a semiconductor storage device (for example, an SSD) and a storage device such as a hard disk or a semiconductor storage device incorporated into a computer system. The program may be transmitted via an electric telecommunication line.

The user controller 231 performs a control process associated with a user. For example, the user controller 231 may perform a log-in process (for example, an authentication process) of a user terminal 10 accessing the conversation control device 20. The user controller 231 may register user information received from a user terminal 10 in the user information storage 221.

The conference room controller 232 performs a control process associated with a conference room. For example, when an instruction to install a new conference room has been received from a user terminal 10, the conference room controller 232 may generate conference room information on the basis of the received information and register the generated conference room information in the conference room information storage 222. The conference room controller 232 virtually installs a conference room at a timing at which the conference room is to be installed. For example, the timing at which a conference room is to be installed is a time at which an instruction to install a new conference room has been received from the user terminal 10 or a time at which a date and time of reservation has come when a reservation for installation of a conference room is registered in advance. When a user performs a predetermined operation for participating in a conference room and predetermined conditions are satisfied, the conference room controller 232 performs a process for allowing the user to participate in the conference room. For example, the conference room controller 232 registers participation of a new user in the conference room by updating the conference room information storage 222.

The display information generator 233 generates information necessary for generating an image to be displayed on the user terminal 10 (display information). Display information may include, for example, information on a conference room which is currently installed and information on users of user terminals 10 which are accessing the conversation control device 20. The display information generator 233 transmits the generated display information to the user terminals 10.

The conversation controller 234 receives voice data from user terminals 10. The conversation controller 234 generates voice data (hereinafter referred to as "conversation voice data") to be output to the user terminals 10 and transmits the conversation voice data to the user terminals 10. The conversation controller 234 may generate the conversation voice data, for example, on the basis of what conversation a user of each user terminal 10 participates in.

A relationship between an image displayed on a user terminal 10 and conversation voice data which is output when the corresponding image is displayed will be described below.

Figure 4:
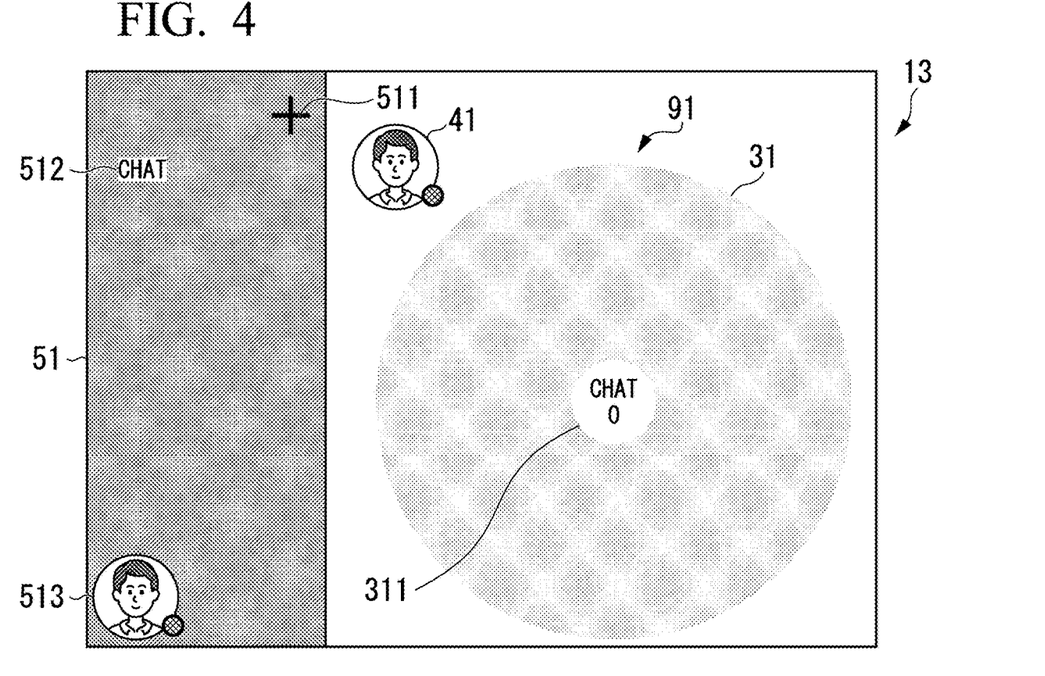
FIG. 4 is a diagram illustrating an example of an image which is displayed on a display 13 of the user terminal 10.

FIG. 4 is a diagram illustrating an example of an image which is displayed on the display 13 of the user terminal 10. In FIG. 4, a conference room area image 31, an icon image 41, and an operation area image 51 are displayed on the display 13. An image of a virtual space in which a conference room can be installed is displayed on the display 13. The virtual space mainly includes an area of a conference room and an area outside of the conference room. The area of a conference room is displayed as a conference room area image 31. The area outside of a conference room (hereinafter referred to as an "outside area") is an area indicated by a reference sign 91 and is an area in which an icon image 41 of a user who is not in the conference room is displayed.

The conference room area image 31 is displayed as a geometrical image indicating an area with a predetermined size. In an example of the embodiment, the conference room area image 31 is displayed as a circular image including a shared area 311 at the center thereof. Some or all of the conference room information may be displayed in the shared area 311. For example, a character string indicating the theme set for the conference room and a value indicating the number of users who are currently in the conference room may be displayed in the shared area 311. In the shared area 311, a title of a conference may be displayed instead of the character string indicating the theme of the conference room. In the example illustrated in FIG. 4, it is assumed that a conference room with a chat as the theme is installed and the number of users in the conference room is "0."

The icon image 41 is an image indicating information on a user and a virtual position of the user. The icon image 41 may be displayed, for example, on the basis of icon data included in the user information.

The operation area image 51 is an image of an area in which a button or information for performing operations associated with a conversation or a conference room is displayed. The operation area image 51 includes, for example, a conference room installation button 511, a conference room information image 512, and a user information display area 513. When the conference room installation button 511 is operated, the conference controller 172 performs a process of installing a new conference room. Through the process performed by the conference controller 172, the conference room controller 232 registers information on a new conference room (conference room information) in the conference room information storage 222.

The conference room information image 512 is an image indicating information on a conference which is currently installed. In the example illustrated in FIG. 4, a character string (text) indicating the theme of the conference room which is currently installed is displayed in the conference room information image 512. The conference room information image 512 may include a character string or an image in which link information for movement to another uniform resource locator (URL) in response to a user's operation (such as tapping or clicking) is embedded. An operation object image such as a button used to perform an operation for the conference room may be additionally displayed in the conference room information image 512. For example, a button used for a user to enter the conference room may be included in the conference room information image 512.

Information on a user such as an icon image is displayed in the user information display area 513. When a predetermined operation is performed on the user information display area 513, an image (hereinafter referred to as a "user state setting image") for setting information indicating a current state of a user (hereinafter referred to as a "user state") may be additionally displayed. The predetermined operation may be, for example, an operation of tapping or clicking an icon image in the user information display area 513, an operation of moving a pointer onto an icon image in the user information display area 513, or another operation.

Figure 5:
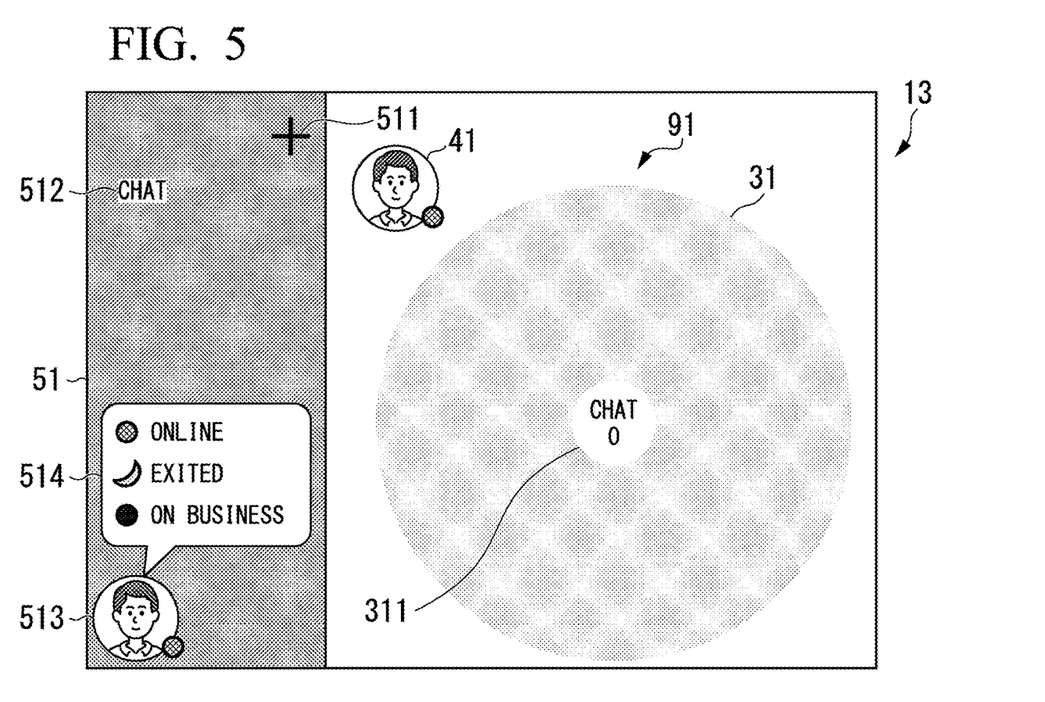
FIG. 5 is a diagram illustrating an example of a user state setting image.

FIG. 5 is a diagram illustrating an example of a user state setting image. When the predetermined operation is performed on the user information display area 513 illustrated in FIG. 4, a user state setting image 514 is displayed. In FIG. 5, for example, icon images and character strings indicating three user states including "online," "exited," and "on business" are displayed in the user state setting image 514.

"Online" indicates, for example, a state in which the corresponding user accesses the conversation control device 20 and can operate a screen. "Exited" indicates, for example, a state in which the corresponding user accesses the conversation control device 20 and has not browse and operate a screen for a moment. "On business" indicates, for example, a state in which the corresponding user accesses the conversation control device 20 and browses the screen, but does not operate the screen for a moment. These examples of the user state are only examples, and the user state may be defined in another mode. For example, the following definitions may be made. "Online" indicates a state in which the voice input 14 and the voice output 15 of the user terminal 10 are activated, "exited" indicates a state in which the voice input 14 and the voice output 15 of the user terminal 10 are inactivated, and "on business" indicates a state in which the voice input 14 of the user terminal 10 is inactivated and the voice output 15 is activated. With these definitions, when the user operates the operator 12 to change the user state, the controller 17 may control the operations of the voice input 14 and the voice output 15 of the user terminal 10 such that the user state reaches the changed state. By constructing the user state setting image 514 in this way, the user can easily set activation and inactivation of the voice input 14 and the voice output 15 by operating the user state setting image 514. Titles indicating the user state are not limited to "online," "exited," and "on business." For example, the titles indicating the user state may be defined as words such as "open," "zone," and "work" instead of "online," "exited," and "on business."

Figure 6:
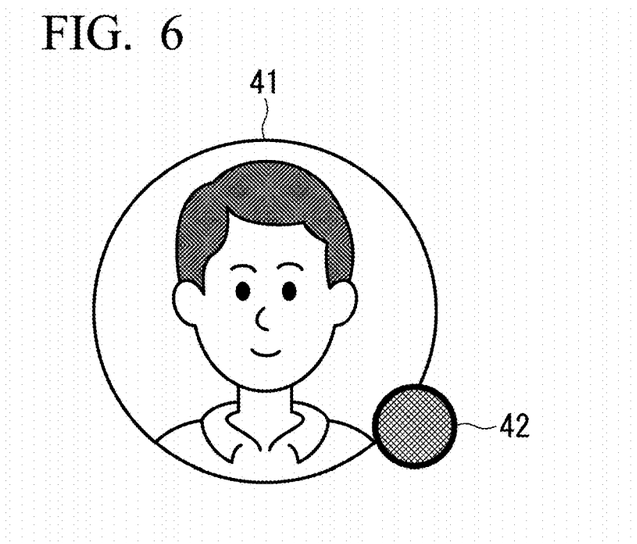
FIG. 6 is a diagram illustrating details of an icon image 41.

FIG. 6 is a diagram illustrating an example of the icon image 41. The icon image 41 may be configured to indicate the user state. In the example illustrated in FIG. 6, the icon image 41 includes a user state image 42 indicating the user state. The user state image 42 is an image indicating the user state. The user state image 42 may be configured to indicate the user state, for example, using shapes or colors. For example, icon images of the user states in the user state setting image 514 may be displayed as the user state image 42. The user state image 42 illustrated in FIG. 6 indicates that the user state is "online." A mode for indicating the user state with the icon image 41 is not limited to the mode using the user state image 42. For example, the user state may be indicated in a mode in which the color of the icon image 41 changes according to the user state. For example, the icon image 41 may be displayed in a normal color when the user state is "online," the icon image 41 may be displayed in a color of sepia when the user state is "exited," and the icon image 41 may be displayed in black and white (for example, a binary image) when the user state is "off-line."

Figure 7:
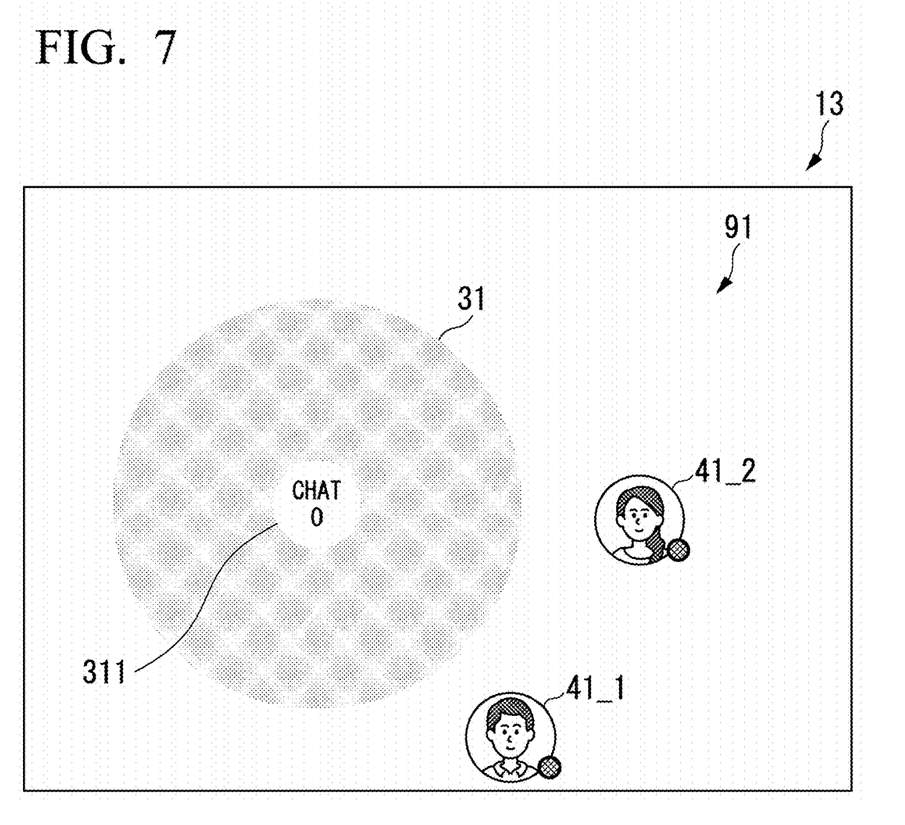
FIG. 7 is a diagram illustrating an example of an image which is displayed on the display 13 of the user terminal 10.

FIG. 7 is a diagram illustrating an example of an image which is displayed on the display 13 of the user terminal 10. In the example illustrated in FIG. 7, icon images 41 (41_1 and 41_2) of two users and a conference room area image 31 of one conference room are displayed. No user yet participates in the conference room indicated by the conference room area image 31. The two users do not participate in any conference room. Accordingly, the icon image 41_1 and the icon image 41_2 are displayed in an outside area 91 instead of the inside of the conference room area image 31.

A user who desires to participate in the conference room can participate in the conference room by performing a predetermined operation. For example, a user who desires to participate in the conference room can participate in the conference room by performing a predetermined operation on a conference room information image 512 of the conference room in which the user desires to participate in the operation area image 51. The predetermined operation may be, for example, an operation on a button for participation. For example, a user who desires to participate in the conference room can participate in the conference room by performing a predetermined operation such as clicking or tapping on the conference room area image 31. For example, a user who desires to participate in the conference room can participate in the conference room by dragging and dropping the icon image 41 displayed in the outside area 91 to the conference room area image 31. When entrance limitation is set for the conference room, only a user whose entrance into the conference is permitted in the entrance limitation can participate in the conference room.

Figure 8:
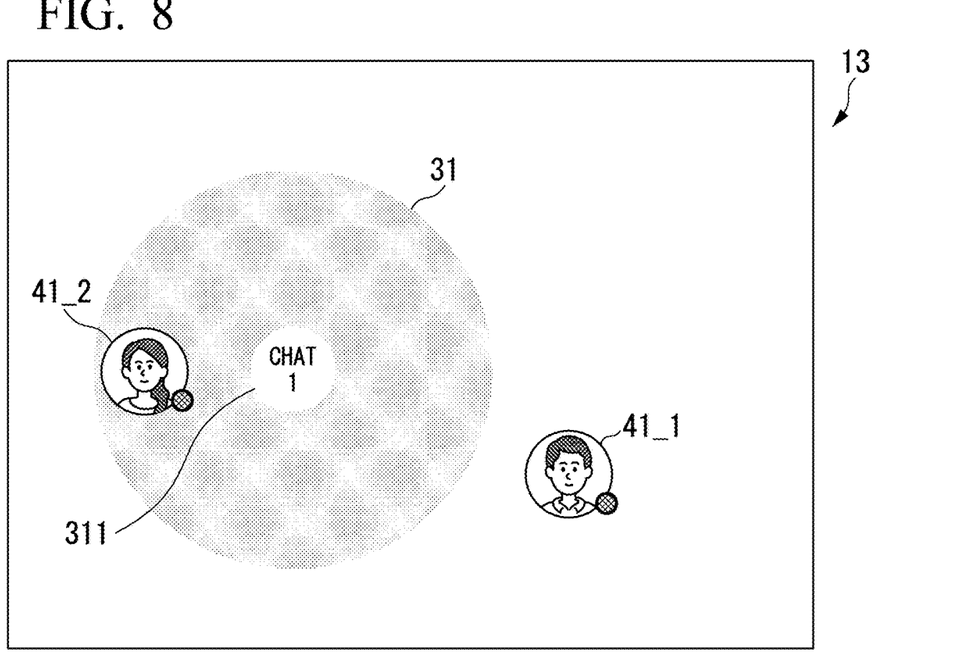
FIG. 8 is a diagram illustrating an example of an image which is displayed on the display 13 of the user terminal 10.

FIG. 8 is a diagram illustrating an example of an image which is displayed on the display 13 of the user terminal 10. In the example illustrated in FIG. 8, one user participates in a conference room with a chat as a main theme. Accordingly, an icon image 41 (41_2) of one user is displayed inside of the conference room area image 31 indicating the conference room with a chat as a main theme. At this time point, no user participates in the same conference room as the user of the icon image 41_2. Accordingly, the user of the icon image 41_2 cannot hold a conversation with another user in the conference room with a chat as a main theme.

When the user of the icon image 41_1 in the outside area 91 performs an operation for participating in the conference room with a chat as a main theme, the user participating in the conference room is notified that there is a user who desires to participate in the conference room. For example, predetermined sound (for example, door knocking sound) may be output from the user terminals 10 of the users. The user to be notified may be all users participating in the conference room or may be only a predetermined user (for example, a user who is a manager of the conference room). When predetermined conditions are satisfied after notification has been performed, the user of the icon image 41_1 can participate in the conference room with a chat as a main theme. The predetermined conditions may include, for example, a condition that a predetermined time (for example, 1 second, 3 seconds, or 5 seconds) has elapsed, a condition that participation in the conference room has been permitted by a predetermined user (for example, a manager or a participant of the conference room), or a condition that participation conditions set in advance for the conference room have been satisfied.

Figure 9:
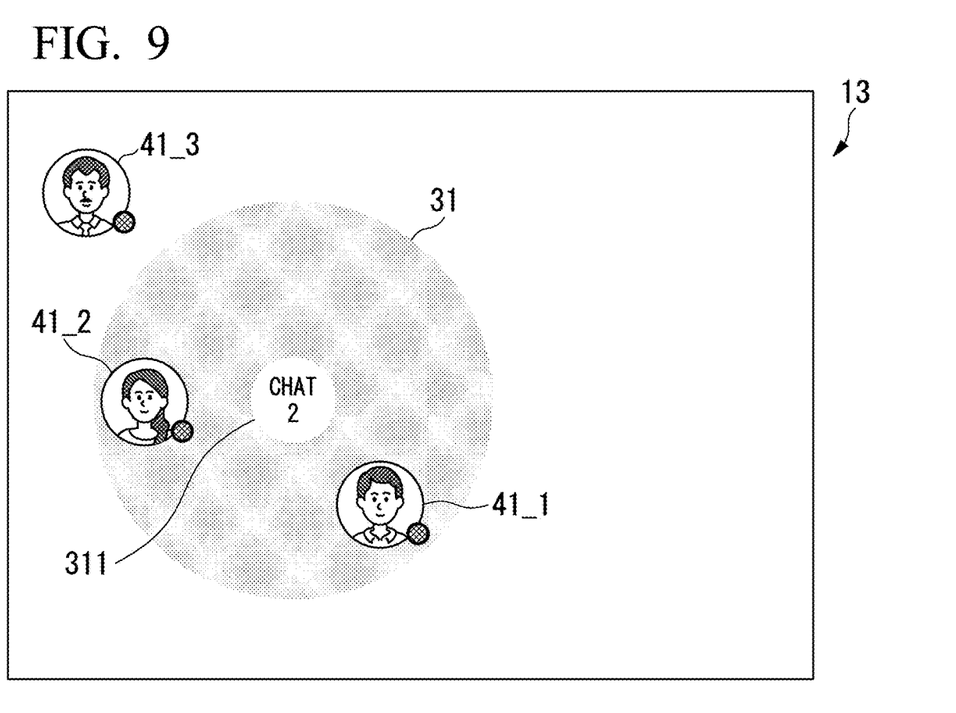
FIG. 9 is a diagram illustrating an example of an image which is displayed on the display 13 of the user terminal 10.

FIG. 9 is a diagram illustrating an example of an image which is displayed on the display 13 of the user terminal 10. In the example illustrated in FIG. 9, two users participate in a conference room with a chat as a main theme. Accordingly, icon images 41 (41_1 and 41_2) of two users are displayed inside of the conference room area image 31 indicating the conference room with a chat as a main theme. At this time point, the user of the icon image 41_1 and the user of the icon image 41_2 participate in the same conference room. Accordingly, the user of the icon image 41_1 and the user of the icon image 41_2 can hold a conversation in the conference room with a chat as a main theme. That is, the users participating in the same conference room can hold a conversation using the user terminals 10.

More specifically, the users participating in the same conference room can hold a conversation as follows. The user terminal 10 of a user participating in the conference room receives voice data uttered by another user participating in the same conference room and outputs the received voice data. The user terminal 10 of a user participating in the conference room transmits voice data uttered by the user to the conversation control device 20. By this transmission, the voice data is output from the user terminal 10 of another user participating in the same conference room. When a user of an icon image 41_3 in the outside area 91 performs an operation for participating in the conference room with a chat as a main theme, the user of the icon image 41_3 can participate in the conference room with a chat as a main theme after predetermined conditions have been satisfied.

Figure 10:
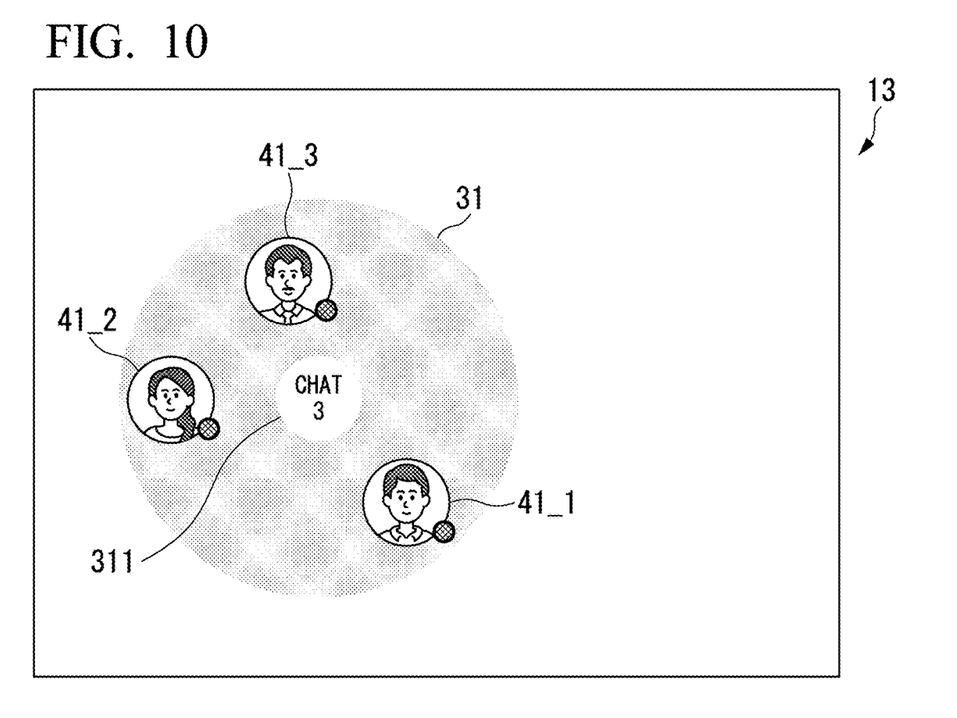
FIG. 10 is a diagram illustrating an example of an image which is displayed on the display 13 of the user terminal 10.

FIG. 10 is a diagram illustrating an example of an image which is displayed on the display 13 of the user terminal 10. In the example illustrated in FIG. 10, three users participate in a conference room with a chat as a main theme. Accordingly, icon images 41 (41_1, 41_2, and 41_3) of three users are displayed inside of the conference room area image 31 indicating the conference room with a chat as a main theme. At this time point, the user of the icon image 41_1, the user of the icon image 41_2, and the user of the icon image 41_3 participate in the same conference room. Accordingly, the user of the icon image 41_1, the user of the icon image 41_2, and the user of the icon image 41_3 can hold a conversation in the conference room with a chat as a main theme. The same is true of a case in which four or more users participate in the same conference room.

Figure 11:
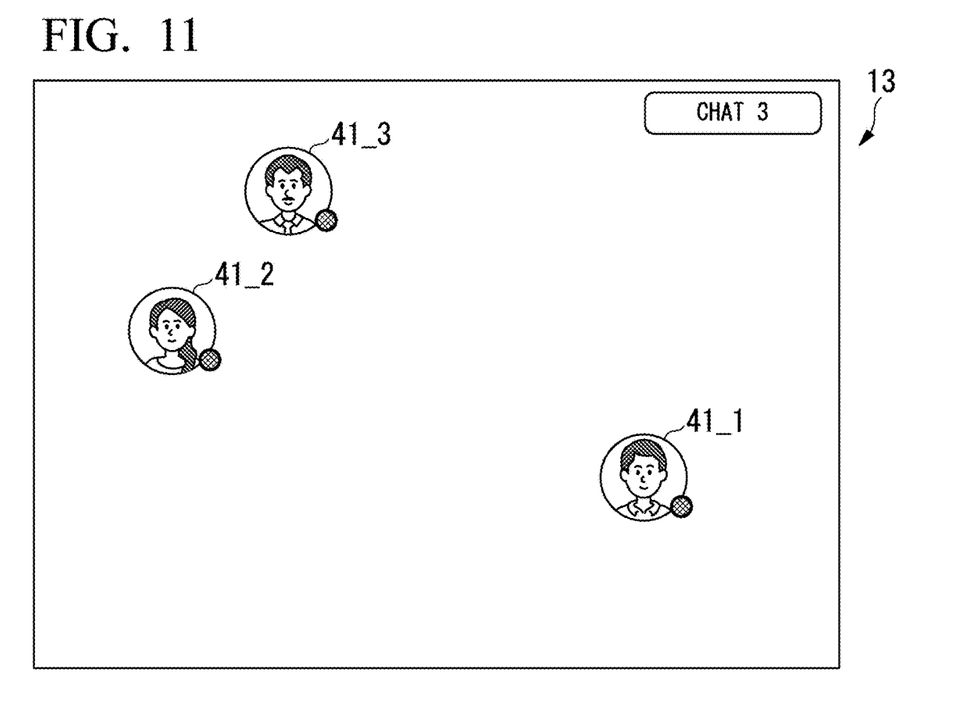
FIG. 11 is a diagram illustrating an example of an image which is displayed on a conference room screen.

FIG. 11 is a diagram illustrating an example of an image which is displayed on a conference room screen. In the example illustrated in FIG. 11, an example of a conference room screen of a conference room with a chat as a main theme in the state illustrated in FIG. 10 is illustrated. The conference room screen is a screen indicating an inside state of a conference room. Icon images 41 of users participating in the conference room may be displayed on the conference room screen. In the example illustrated in FIG. 11, icon images 41 (41_1, 41_2, and 41_3) of three users are displayed on the conference room screen. The user terminal 10 of a user participating in a conference room receives voice data uttered by another user participating in the same conference room and outputs the received voice data. At this time, a volume of vocal sound to be output may be controlled on the basis of a position of an icon image.

For example, a distance on an image of the icon image 41_2 from the icon image 41_3 is smaller than that of the icon image 41_1. Accordingly, in the user terminal 10 of the user of the icon image 41_3, vocal sound of the user of the icon image 41_2 may be output more loudly than vocal sound of the user of the icon image 41_1. This control may be performed by the conversation control device 20 or may be performed by the user terminal 10.

Figure 12:
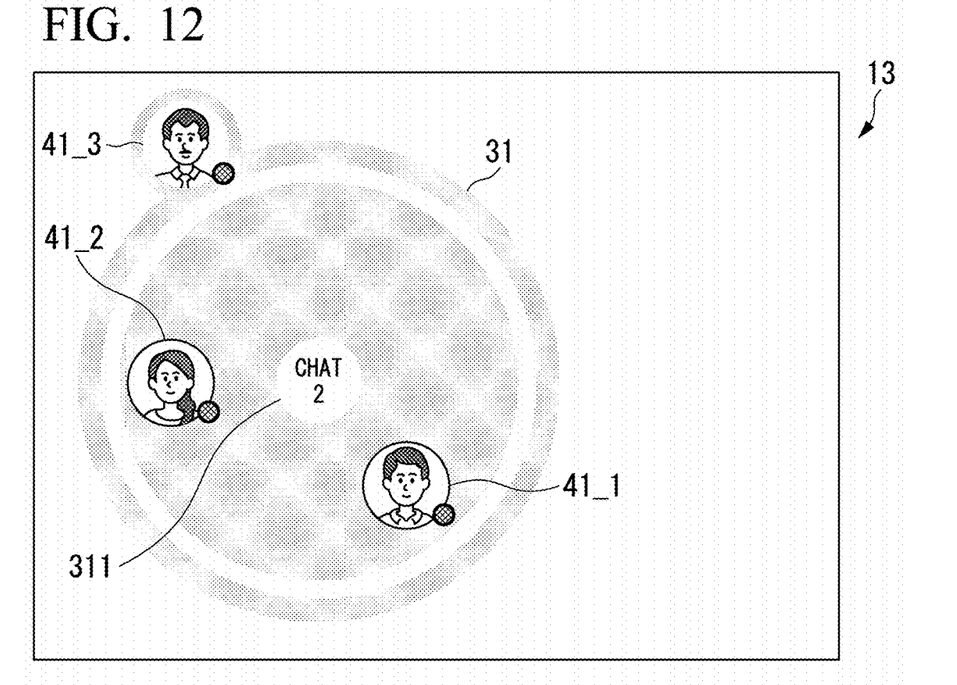
FIG. 12 is a diagram illustrating an example of a conference room area image 31 of a conference room to which a fixture user is connected.

FIG. 12 is a diagram illustrating an example of the conference room area image 31 of a conference room to which a fixture user is connected. A fixture user cannot utter but can hear utterance details of another user in the conference room. In other words, utterance details of a fixture user are not output to other users connected to the same conference room, but utterance details of the other users connected to the same conference room are output to the fixture user.

In the example illustrated in FIG. 12, a fixture user is connected to a conference room with a chat as a main theme. An icon image 41_3 of the fixture user may be displayed in a mode other than that of icon images 41 (for example, an icon image 41_1 and an icon image 41_2) of users other than the fixture user. For example, as illustrated in FIG. 12, an outer frame of the icon image 41_3 may be displayed in a display mode similar or equal to that of the conference room area image 31 of the conference room to which the fixture user is connected. In the example illustrated in FIG. 12, the icon image 41_3 of the fixture user is surrounded by a frame of the same shape as the shape of the conference room area image 31. The icon image 41_3 of the fixture user may be displayed in a mode in which it protrudes from the conference room area image 31 instead of being displayed inside the conference room area image 31. By displaying the icon image 41_3 of the fixture user in this way, a user can easily determine what user is connected as a fixture user to each conference room.

The conference room area image 31 of a conference room to which a fixture user is connected may be displayed in a mode other than that of the conference room area image 31 of a conference room to which a fixture user is not connected. For example, as illustrated in FIG. 12, the conference room area image 31 of a conference room to which a fixture user is connected may be constituted by a plurality of concentric circles having the same shape. By displaying the conference room area image 31 of a conference room to which a fixture user is connected in this way, a user can easily determine whether a fixture user is connected to each conference room.

Figure 13:
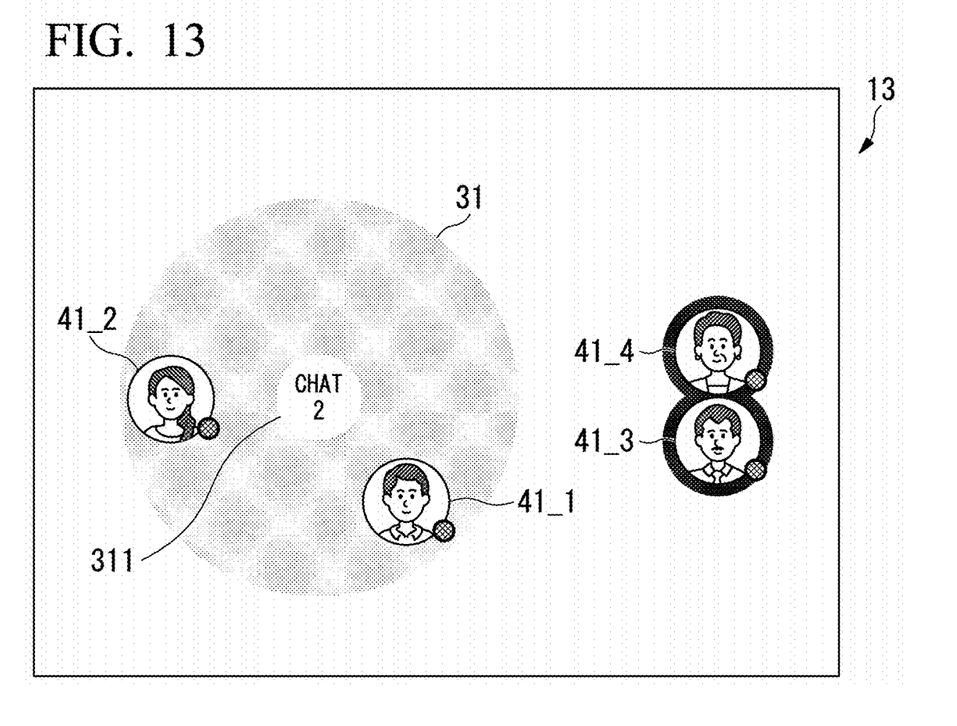
FIG. 13 is a diagram illustrating an example of icon images 41 of users who are holding a private conversation.

FIG. 13 is a diagram illustrating an example of icon images 41 of users who hold a private conversation. Users who hold a private conversation can hold a private conversation with a partner of the private conversation such that vocal sound is not output to users other than the partner of the private conversation. In other words, utterance details in a private conversation are output to only the users holding the private conversation but are not output to the other users. A private conversation may be started, for example, by allowing a user to perform a predetermined operation (for example, clicking or tapping) on an icon image 41 of another user with which the user desire to hold the private conversation. In this case, the user terminal 10 of the user of the operated icon image 41 may be notified that there is a private conversation start request by the conversation control device 20. The user of the operated icon image 41 may input whether to accept or reject the private conversation start request to the user terminal 10. The private conversation may be started in response to an input indicating that the private conversation start request is accepted. When a private conversation is already held, another user may be able to participate in the private conversation.

In the example illustrated in FIG. 13, a user of an icon image 41_3 and a user of an icon image 41_4 hold a private conversation. The icon images 41_3 and 41_4 of the users who hold a private conversation may be displayed in a mode other than that of icon images 41 (for example, an icon image 41_1 and an icon image 41_2) of users who do not hold a private conversation. For example, as illustrated in FIG. 13, an outer frame of the icon image 41_3 of the user holding a private conversation may be displayed in the same shape as an outer frame of the icon image 41_4 of the partner of the private conversation. The icon images 41_3 and 41_4 of the users who hold a private conversation may be displayed to stick to each other. By displaying the icon images 41_3 and 41_4 of the users who hold a private conversation in this way, a user can easily determine what users hold a private conversation.

In a private conversation, a user who has participated in the private conversation or a user who is going to hold a private conversation can set a secret mode. Regarding a private conversation in which a secret mode is set, another user cannot participate in the private conversation. When a secret mode is set in a private conversation, icon images 41 of users who hold the private conversation may be displayed in a mode other than that of icon images 41 of users who hold a usual private conversation. For example, when a secret mode is set in a private conversation, a specific image (for example, an image of a key shape) may be added to icon images 41 of users who participate in the private conversation.

Figure 14:
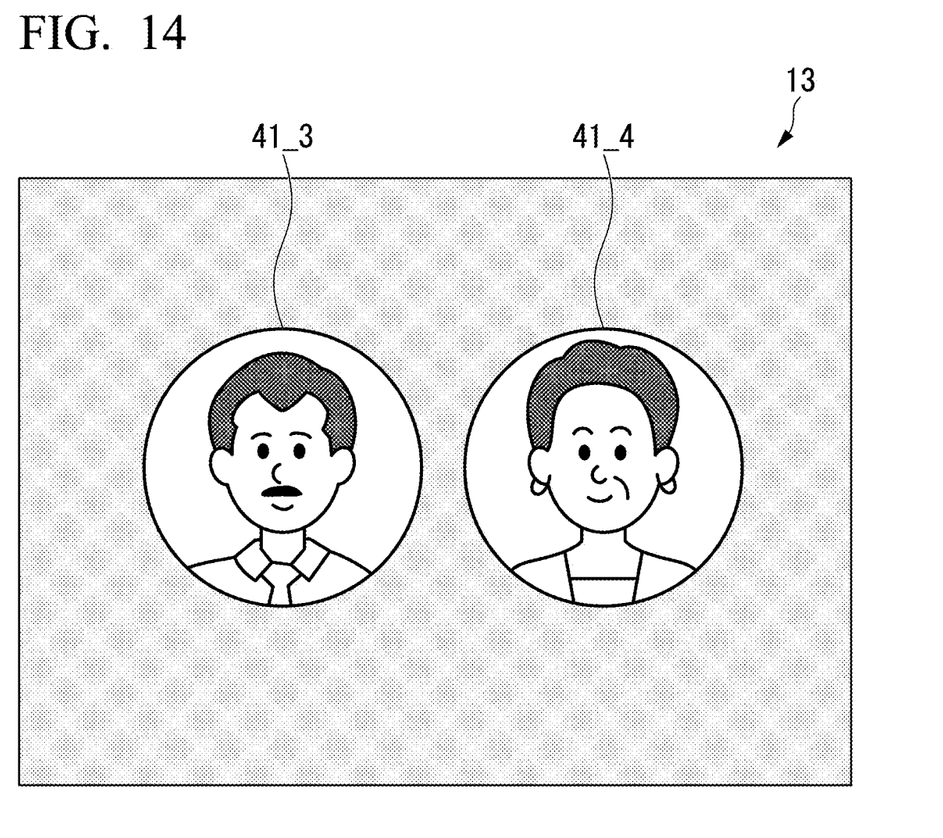
FIG. 14 is a diagram illustrating an example of an image which is displayed on a private conversation screen.

FIG. 14 is a diagram illustrating an example of an image which is displayed on a private conversation screen. In the example illustrated in FIG. 14, an example of a private conversation screen associated with a private conversation of two users in the state illustrated in FIG. 13 is illustrated. A private conversation screen is a screen indicating a state of a corresponding private conversation. On the private conversation screen, icon images 41 of users who participate in the private conversation may be displayed. In the example illustrated in FIG. 14, an icon image 41_3 and an icon image 41_4 are displayed. This private conversation screen may be displayed on only the user terminals 10 of users who participate in the private conversation. By displaying the private conversation screen in this way, a user can easily determine with what user the user holds a private conversation.

Figure 15:
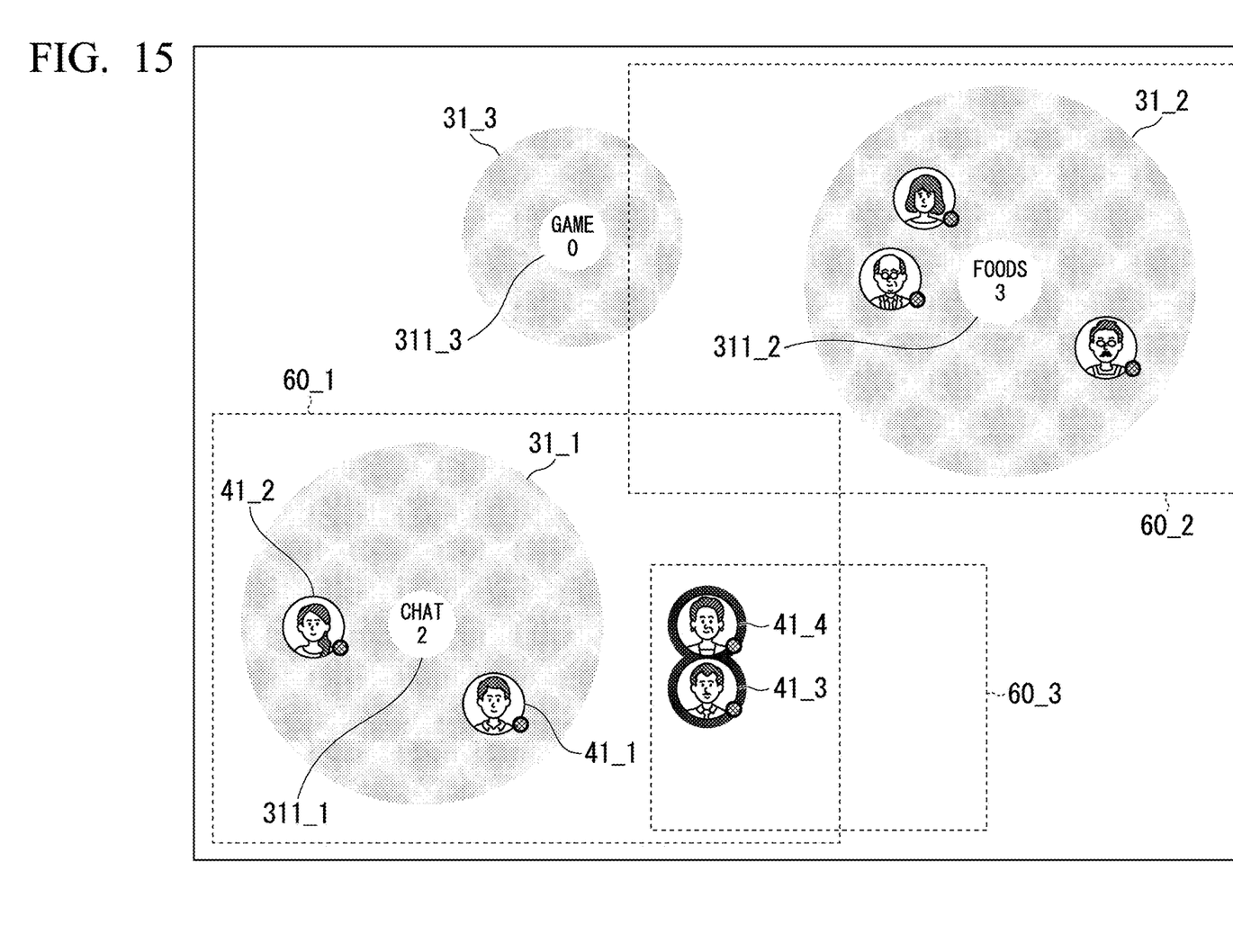
FIG. 15 is a diagram illustrating an example of a virtual space.

FIG. 15 is a diagram illustrating an example of a virtual space. A virtual space is a virtual space in which conference rooms are arranged or icon images 41 of users are arranged. In a virtual space, each user can move or install a conference room. All virtual spaces do not need to be displayed on a user terminal 10. Only the same place in the virtual space does not need to be displayed on the user terminals 10 of all users. That is, only an arbitrary space in the virtual space may be displayed on the user terminal 10 of each user. The sizes of areas of the displayed spaces may be different. For example, in the example illustrated in FIG. 15, an area 60_1 which is displayed on a user terminal 10 of a first user, an area 60_2 which is displayed on a user terminal 10 of a second user, and an area 60_3 which is displayed on a user terminal 10 of a third user are displayed at different positions. The area 60_1 and the area 60_2 have the same size, and the area 60_1 and the area 60_3 have different sizes. The screen of the area 60_1 displayed on the user terminal 10 of the first user is illustrated in FIG. 13, and the conference room area image 31 and the shared area 311 are displayed as a conference room area image 31_1 and a shared area 311_1. In FIG. 15, a conference room area image 31_2 and a conference room area image 31_3 in addition to the conference room area image 31_1 are illustrated. A shared area 311_2 included in the conference room area image 31_2 indicates that the conference room indicated by the conference room area image has foods as a main theme and three users participate in the conference room. A shared area 311_3 included in the conference room area image 31_3 indicates that the conference room indicated by the conference room area image has games as a main theme and no user participates in the conference room yet.

Figure 16:
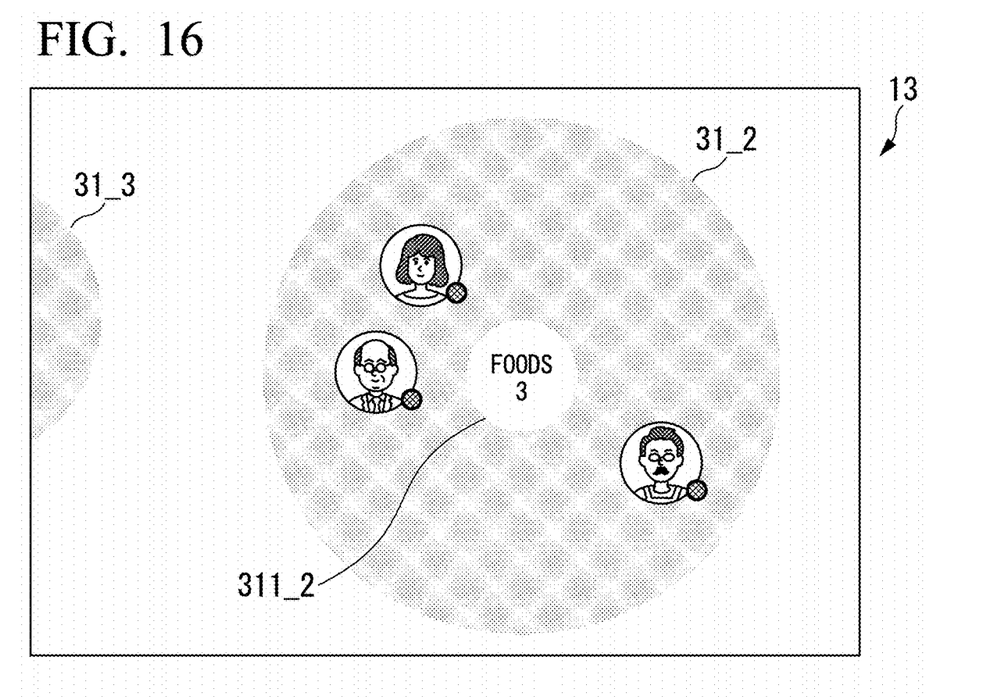
FIG. 16 is a diagram illustrating an example of an image which is displayed on the display 13 of the user terminal 10.
Figure 17:
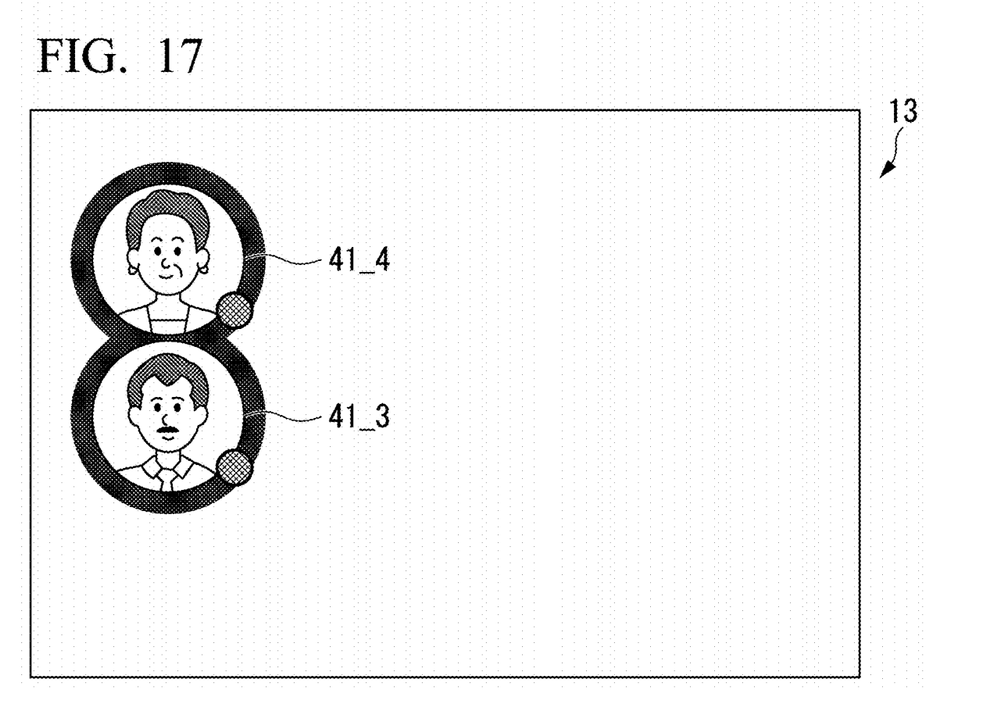
FIG. 17 is a diagram illustrating an example of an image which is displayed on the display 13 of the user terminal 10.

FIGS. 16 and 17 are diagrams illustrating examples of an image which is displayed on the display 13 of the user terminal 10. An image of the area 60_2 which is displayed on the user terminal 10 of the second user is illustrated in FIG. 16. A screen of the area 60_3 which is displayed on the user terminal 10 of the third user is illustrated in FIG. 17. Since screens of different areas can be displayed on the user terminals of the users in this way, it is possible to display an area which each user desires to ascertain in a desired size and to enable each user to easily determine a situation of a conversation at an arbitrary position in the virtual space. Each user may change a screen such that a different conference room area image 31 is displayed in a state in which the user participates in a certain conference room. In this case, a user may be able to easily move from a certain conference room to another conference room by performing an operation for entering another conference room area image 31.

With the conversation system 100 having the aforementioned configuration, it is possible to more easily select a desired conversation or conference out of a plurality of conversations or conferences. Specifically, a desired conversation or conference is selected as follows. By performing a predetermined operation on an icon image 41 of a partner who a user desires to hold a conversation (for example, a private conversation) or a conference room area image 31 of a conference room in which the user desires to participate on a screen in which positions or a plurality of icon images 41 or conference room area images 31 are displayed, the user can easily select a desired conversation or conference. Accordingly, for example, in comparison with a case in which an URL for a WEB conference and a conference room are set in a one-to-one correspondence manner in advance as in the related art, a user can easily select a desired conversation or conference room and participate in the selected conversation or conference room.

A user can select a partner of a conversation (for example, a private conversation) by seeing icon images 41. Accordingly, the user can start a conversation with information of a certain level on a partner of the conversation. Icon images 41 of users who participate in the conference room are displayed in the conference room area image 31. Accordingly, when a user participates in a conference room, the user can participate in the conference room with information of a certain level on other users participating in the conference room.

While an embodiment of the present invention has been described above in details with reference to the drawings, a specific configuration thereof is not limited to the embodiment and includes designs without departing from the gist of the present invention.

INDUSTRIAL APPLICABILITY

The present invention can be used, for example, for an online conversation.

REFERENCE SIGNS LIST

100 Conversation system
10 User terminal
20 Conversation control device
11 Communicator
12 Operator
13 Display
14 Voice input
15 Voice output
16 Storage
161 User information storage
17 Controller
171 Display controller
172 Conference controller
173 Conversation controller
21 Communicator
22 Storage
221 User information storage
222 Conference room information storage
23 Controller
231 User controller
232 Conference room controller
233 Display information generator
234 Conversation controller
31 Conference room area image
311 Shared area
41 Icon image
42 User state image
51 Operation area image
511 Conference room installation button
512 Conference room information image
513 User information display area
514 User state setting image
91 Outside area

The invention claimed is:

1. A conversation control device comprising:

a memory; and processing circuitry connected to the memory, the processing circuitry being configured to:

generate display data necessary for displaying a plurality of conference room area images which are images indicating a plurality of virtual conference rooms in which a conversation is held via a network and which are currently installed in a virtual space and an icon image indicating a user on a user terminal;

control participation of a user in any of the plurality of virtual conference rooms in response to the user's operation; and control a conversation between users participating in the same virtual conference room, wherein the processing circuitry is configured to output speech details of a user participating in the any of the plurality of virtual conference rooms to a user who is connected to the any of the plurality of virtual conference rooms in a mode other than participation, wherein the processing circuitry is configured not to output speech details of the user who is connected to the any of the plurality of virtual conference rooms in the mode to the user participating in the any of the plurality of virtual conference rooms, and wherein the processing circuitry is configured to display such that an icon image of the user who is connected to the any of the plurality of virtual conference rooms in the mode is in a mode other than that of an icon image of the user participating in the any of the plurality of virtual conference rooms.

2. The conversation control device according to claim 1, wherein the processing circuitry is configured to perform a process of allowing a user to participate in the any of the plurality of virtual conference rooms corresponding to a conference room area image in response to the user's predetermined operation on the conference room area image.

3. A conversation system comprising:

a memory; and processing circuitry connected to the memory, the processing circuitry being configured to:

generate image data including a plurality of conference room area images which are images indicating a plurality of virtual conference rooms in which a conversation is held via a network and which are currently installed in a virtual space and an icon image indicating a user on a user terminal;

control participation of a user in any of the plurality of virtual conference rooms in response to the user's operation; and control a conversation between users participating in the same virtual conference room, wherein the processing circuitry is configured to generate image data in which an icon image of a user participating in the any of the plurality of virtual conference rooms is disposed inside of a conference room area image indicating the any of the plurality of virtual conference rooms, wherein the processing circuitry is configured to output speech details of a user participating in the any of the plurality of virtual conference rooms to a user who is connected to the any of the plurality of virtual conference rooms in a mode other than participation, wherein the processing circuitry is configured not to output speech details of the user who is connected to the any of the plurality of virtual conference rooms in the mode to the user participating in the any of the plurality of virtual conference rooms, and wherein the processing circuitry is configured to display such that an icon image of the user who is connected to the any of the plurality of virtual conference rooms in the mode is in a mode other than that of an icon image of the user participating in the any of the plurality of virtual conference rooms.

4. A conversation control method comprising:

generating display data necessary for displaying a plurality of conference room area images which are images indicating a plurality of virtual conference rooms in which a conversation is held via a network and which are currently installed in a virtual space and an icon image indicating a user on a user terminal;

controlling participation of a user in any of the plurality of virtual conference rooms in response to the user's operation; and controlling a conversation between users participating in the same virtual conference room, wherein, in the controlling of the conversation, speech details of a user participating in the any of the plurality of virtual conference rooms are output to a user who is connected to the any of the plurality of virtual conference rooms in a mode other than participation, and wherein, in the controlling of the conversation, speech details of the user who is connected to the any of the plurality of virtual conference rooms in the mode are not output to the user participating in the any of the plurality of virtual conference rooms, and wherein, an icon image of the user who is connected to the any of the plurality of virtual conference rooms in the mode is displayed in a mode other than that of an icon image of the user participating in the any of the plurality of virtual conference rooms.

\* \* \* \* \*